United States Patent [19]
Lee et al.

[11] 3,965,269
[45] June 22, 1976

[54] METHOD OF EXTRACTING ROASTED COFFEE

[75] Inventors: William F. Lee, Dollard des Ormeauz; William J. Jeffery, Chateauguay Centre; Richard R. Pyves; Moshi Y. Isaac, both of Montreal, all of Canada

[73] Assignee: General Foods Limited, Toronto, Canada

[22] Filed: Dec. 11, 1972

[21] Appl. No.: 313,726

[30] Foreign Application Priority Data
Nov. 2, 1972  Canada ............................. 155431

[52] U.S. Cl. .................. 426/387; 23/272.5; 426/434
[51] Int. Cl.² ........................................... A23F 1/08
[58] Field of Search .......... 426/432, 434, 365, 366, 426/388, 330, 478, 425, 433, 193, 386, 387, 594; 23/272.5

[56] References Cited
UNITED STATES PATENTS

| 2,420,615 | 5/1947 | Palmer | 426/434 |
|---|---|---|---|
| 2,949,364 | 8/1960 | Bilenker | 426/434 |
| 3,089,772 | 5/1963 | Bowden et al. | 426/434 |
| 3,224,879 | 12/1965 | Di Nardo | 426/432 |
| 3,656,964 | 4/1972 | Mansky et al. | 426/434 |
| 3,790,689 | 2/1974 | Pitchon et al. | 426/434 |
| 3,810,766 | 5/1974 | Holzberg | 426/386 |

*Primary Examiner*—Frank W. Lutter
*Assistant Examiner*—Neil F. Greenblum
*Attorney, Agent, or Firm*—Bruno P. Struzzi; Gerald E. Jacobs; Thomas R. Savoie

[57] ABSTRACT

A novel process for extracting roasted coffee using split-extraction percolation techniques is disclosed comprising obtaining an autoclave coffee extract by passing aqueous extraction liquid through the autoclave section of the percolator set, splitting the autoclave extract into a product portion and a feed portion, obtaining an atmospheric coffee extract product from the atmospheric section of the percolator set by passing the feed portion of the autoclave coffee extract through the atmospheric section, and further processing the atmospheric coffee extract product and the product portion of the autoclave extract to obtain a dry instant coffee product.

11 Claims, No Drawings

METHOD OF EXTRACTING ROASTED COFFEE

BACKGROUND OF THE INVENTION

This invention relates to soluble coffee and more particularly to a method of extracting roasted coffee to produce a coffee extract.

In what may be termed the "standard" method of producing a coffee extract, roasted and ground coffee is contacted with an aqueous extraction liquid in the extraction columns of a percolator set. The percolator set generally is comprised of from 5 to 8 extraction columns connected in series, each column containing progressively fresher roasted and ground coffee. The extraction liquid enters the extraction column containing the most extracted roasted and ground coffee in the set (the spent stage), extracts soluble coffee solids from this coffee, and then passes successively through extraction columns containing progressively fresher coffee thereby increasing in soluble coffee solids concentration. After contacting the freshest or least extracted coffee in the set (the fresh stage), a pre-determined quantity of the liquid is drawn off as coffee extract which generally contains from about 20% – 35% by weight of soluble coffee solids. The quantity of extract drawn off is generally specified as a draw off factor (D.O.F.), i.e., the ratio of the weight of extract drawn off to the weight of roasted and ground coffee charged to the fresh stage extraction column.

After a coffee extract is drawn off from the fresh stage, the column containing the most extracted coffee (the spent stage) is discharged and charged with fresh roasted and ground coffee, thus becoming the fresh stage, i.e., the extraction column from which coffee extract is drawn off, in the next cycle. (Cycle is the time between successive draw-offs of coffee extract). Extraction liquid is then fed to the spent stage for this cycle, the coffee contained therein being the next most extracted coffee from the previous cycle. Successive cycles are continued in the above manner such that a given charge of roasted and ground coffee becomes progressively more extracted with each successive cycle.

In split-extraction percolation, two feed streams of aqueous extraction liquid and two draw-offs of coffee extract are used. The percolator set is essentially divided into two parts, an atmospheric section and an autoclave section. The atmospheric section typically contains from one to four extraction columns containing the least extracted coffee and the autoclave section typically contains from two to five extraction columns containing the most extracted roasted coffee. As in standard percolation, the roasted and ground coffee flows in batches through the percolator set becoming progressively more extracted with each cycle.

An atmospheric aqueous extraction liquid is fed into the extraction column in the atmospheric section of the split-extraction percolator set containing the most extracted roasted and ground coffee for this section and flows through this atmospheric section contacting the coffee contained therein. Coffee extract, hereinafter called atmospheric coffee extract is drawn off from the fresh stage for this section, referred to hereinafter as the fresh stage of the atmospheric section. The atmospheric coffee extract contains the more aromatic and flavorful coffee solids extracted from roasted and ground coffee.

An autoclave aqueous extraction liquid is fed into the spent stage of the autoclave section of the split-extraction percolator set and an auatoclave coffee extract is drawn off from the column containing the least extracted coffee in this section, hereinafter termed the fresh stage for the autoclave section. In the autoclave section the temperatures and pressures within the extraction columns are significantly higher than in the atmospheric section of the split-extraction percolator set and the coffee solids in the autoclave coffee extract are largely autoclaved solids whereas the solids in the atmospheric coffee extract are largely atmospherically extracted solids.

A disadvantage with prior art split-extraction percolation methods has been the low concentrations of coffee solids obtained from the atmospheric section of the percolator set. Such low concentrations necessitate further concentration of the atmospheric extract if it is to be dried separately prior to being added to separately dried autoclave coffee extract. Concentration of the atmospheric extract is normally accompanied by a loss of volatile aromatics and, hence, the final coffee product lacks to some degree the characteristic flavor and aroma of freshly brewed coffee. Prior art efforts to increase the soluble solids content in the atmospheric coffee extract are usually accompanied by a decrease in yield (ratio of weight of coffee solids in extract to weight of coffee loaded to fresh stage) for the atmospheric section if the draw-off is reduced or a decrease in quality if the temperature and pressure in the atmospheric section are increased. While some of the yield loss in the atmospheric section may be picked up when these coffees are extracted in the autoclave section, it is at the penalty of greater water loads to the evaporator which concentrates the autoclave extract product.

SUMMARY OF THE INVENTION

A novel process for extracting roasted coffee using split-extraction percolation has been discovered comprising extracting soluble solids from roasted and ground coffee in the autoclave section of the split-extraction percolator set and drawing off an autoclave coffee extract, splitting the autoclave coffee extract into a feed portion and a product portion, extracting the coffees contained in the atmospheric section of the percolator set by passing the feed portion of the autoclave coffee extract through the atmospheric section, and drawing off a quantity of atmospheric coffee extract. The product portion of the autoclave coffee extract and the atmospheric coffee extract are then combined either before or after drying.

The roasted and ground coffee of this invention may be any coffee type or blend, any suitable color or grind size, and may be decaffeinated or undecaffeinated.

In the preferred embodiment of this invention, the portion of the autoclave coffee extract not used for feed to the atmospheric section, i.e., the product portion, is stripped by some suitable method to remove aromatics. The extract is then concentrated and added with the removed aromatics to the atmospheric coffee extract. The combined extract is then dried by some suitable means.

Alternatively, the product portion of the autoclave coffee extract and the atmospheric coffee extract are separately dried before being combined. When operating in this manner, it is preferred to dry the atmospheric coffee extract, which contains the higher quality aromatic and flavor notes, by methods aimed at increased aromatic retention such as freeze-drying or low-temperature spray-drying.

By employing the process of this invention, coffee solids concentrations in the atmospheric coffee extract may be increased by greater than 30% when compared to concentrations obtained from normal split-extraction percolation without a decrease in yield. Other advantages of this process will become apparent from the more detailed description which follows.

DETAILED DESCRIPTION OF THE INVENTION

In the split-extraction percolation process of this invention, aqueous extraction liquid is fed to the spent stage of the autoclave section. The liquid is generally water but may be any solution of salts or soluble coffee solids and is generally heated to about 300°F to 400°F before being fed to the spent stage.

The extraction liquid flows through the series of extraction columns in the autoclave section, contacting the coffee contained therein, and thereby increasing in soluble coffee solids content. The number of columns in the autoclave section of the split-extraction percolator set may vary widely according to the number of total columns in the percolator set, the particular processing conditions, and other like factors. It may be preferable to operate the split-extraction percolator set with an equal number of columns in the autoclave and atmospheric sections of the set.

Since the coffee contained in the autoclave section consists of the more extracted coffees in the overall percolator set, relatively large draw-offs are preferred to achieve a reasonable yield of soluble solids. Draw-off factors typically are between 3.0 and 7.0.

The autoclave coffee extract drawn off from the fresh stage of the autoclave section typically contains about 4% to 8% soluble coffee solids by weight. A key to the present invention resides in using a portion of this autoclave coffee extract as the feed stream for the atmospheric section of the percolator set. The remaining portion, termed the "product" portion is later mixed with the atmospheric coffee extract.

The amount of the autoclave coffee extract which is used as the feed material for the atmospheric section is not fixed but is dependent upon a variety of operating conditions. The amount used, of course, is dictated by the concentrations and yields desired from the atmospheric section, which, in turn, is dependent upon the D.O.F. used in the atmospheric section. In the preferred method of operation, the autoclave extract stream is divided into two equal portions, one portion of which constitutes the feed to the atmospheric section. As used in describing the process of this invention, drawing off an autoclave extract splitting the extract, and using a portion as the feed material to the atmospheric section is intended to include either collecting the entire autoclave extract and then dividing it into a feed portion and a product portion, or splitting the extract as it is drawn off from the fresh stage of the autoclave section. For example, the first part of the autoclave extract drawn off may be used as the product portion of the autoclave extract and the second part drawn off may be used as the feed material to the atmospheric section. While it is generally preferred to operate in this order since the first part of the draw off may contain more coffee solids and aromatics and is therefore more desirable as the product portion, it is also possible to use the first portion as feed material.

The feed portion of the autoclave coffee extract will normally be fed to the most spent stage of the atmospheric section at temperatures from about 150°F to 300°F, preferably below 250°F, and most preferably below 210°F for maximum flavor. Thus, whether this feed material is to be heated or cooled is dependent upon the temperature at which the autoclave extract is drawn-off. In normal practice, the entire autoclave extract will be cooled preferably to below 100°F and the feed portion to the atmospheric section will be heated to the desired inlet temperature for the atmospheric section of the percolator set. Alternatively, the feed portion may be separated from the autoclave extract prior to cooling, and then suitably treated to be fed at the desired temperature to the atmospheric section. The remaining product portion of the autoclave extract may then be cooled to below 100°F to prevent flavor degradation.

The coffees contained in the atmospheric section are extracted with the feed portion of the autoclave coffee extract, and an atmospheric coffee extract is drawn off from the fresh stage of the atmospheric section. Since relatively unextracted coffees are contacted in the atmospheric section, D.O.F.'s needed to obtain reasonable yields are generally between 0.5 and 3.0. The concentration of the atmospheric coffee extract, generally between 10% to 18% by weight in normal split-extraction percolation, may be increased up to 25% and greater according to the process of this invention.

Inter-column coolers may be used to insure an extract draw-off temperature of about 200°F in both the autoclave and atmospheric sections. In the case of the autoclave extract, it is preferred to cool as it is drawn off from the freshest stage of the autoclave section of the set. It may also be preferable to further cool both the autoclave extract product and the atmospheric coffee extract to near room temperature to avoid flavor degradation prior to drying.

The product portion of the autoclave coffee extract and the atmospheric coffee extract are then further processed to form a soluble coffee product. The two coffee extract streams may be combined prior to drying or dried separately. In the latter instance it may be preferable to freeze-dry the atmospheric coffee extract which contains the more flavorful aromatic constituents and spray-dry the autoclave extract product. It may also be desirable to concentrate the autoclave extract product to a solids content of about 25% to 60%. Concentration techniques such as evaporation, vacuum evaporation or freeze-concentration are suitable for such a purpose. This extract may then be combined with the atmospheric coffee extract either before drying or after separate drying.

In a preferred embodiment of this invention, aromatics are stripped from the product portion of the autoclave coffee extract and then later reincorporated into the extract after the extract has been concentrated.

As mentioned previously, use of the process of this invention makes it possible to achieve higher concentrations in the atmospheric coffee extract without a corresponding overall yield decrease for the atmospheric section. If the product extracts from the atmospheric section and the autoclave section are to be separately dried before being combined, the increased concentrations in the atmospheric extract makes it possible to dry this extract without a concentrating step. By eliminating the concentration step, fewer volatiles are lost from this highly aromatic extract.

Since it is desirable to concentrate the product portion of the autoclave extract before adding it to the atmospheric extract either in liquid or dried form, a further advantage is realized. By using a portion of the autoclave extract as feed to the atmospheric section, the amount of material to be concentrated is decreased and thus fewer volatiles are lost and less heat loads are needed. Still further, in the preferred embodiment of this invention, stripping of the aromatics from the product portion of the autoclave extract before concentration results in still fewer volatile aromatic losses in the concentration step. The removed aromatics are then re-incorporated into the product either by addition to the mixture of the concentrated product portion of the autoclave extract and the atmospheric extract to either of the individual extracts, or addition to a mixture of the powders obtained by separately or collectively drying the above-mentioned coffee extracts or to either individually dried powder. A preferred technique is to add the stripped aromatics to the atmospheric extract which may then be freeze-dried or spray-dried under controlled conditions for the protection of flavor.

The following example will serve to illustrate the process of this invention and its above-described advantages.

EXAMPLE I

In this embodiment of the invention, the product portion of the autoclave coffee extract is concentrated, mixed with the atmospheric coffee extract, and the composite mixture is freeze-dried.

Control-Run — A blend of roasted coffee was ground and loaded into the six extraction columns of a split-extraction percolator set (about 20.5 lbs. coffee/column). D.O.F.'s were chosen so as to achieve an overall yield of about 40%. At steadystate operation, water at 358°F was fed to the spent stage of the autoclave section of the percolator set. (The autoclave section consisted of three extraction columns). A draw-off factor of 4.06 was used to obtain 84.8 lbs. of autoclave coffee extract. The extract was drawn off from the fresh stage of the autoclave section at 210°F and fed to a storage tank where it was cooled to 100°F. The concentration of this extract was 6.07% soluble coffee solids by weight of the extract. The extract was stripped of aromatics using a vacuum technique and the aromatics were collected and condensed. The stripped autoclave extract was then concentrated to 35% solids using vacuum evaporation requiring the removal of 69.8 pounds of water.

Water at 273°F was fed to the spent stage of the atmospheric section of the percolator set and an atmospheric coffee extract was drawn off using a D.O.F. of 1.0 to obtain 21.2 pounds of extract. The concentration of this extract was 17.0% solids by weight of the extract. This extract was then added to the concentrated autoclave extract from above resulting in an overall concentration of 22% solids by weight. The condensed aromatics were added at a level of 3% by weight and the composite mixture was freeze-dried. The yield from the autoclave section was 24.6% on a dry basis and 17.1% for the atmospheric section for an overall yield of 41.7%.

Experimental Run — Using the same percolator set, coffee blend, and column load, feed water at 357°F was fed to the spent stage of the autoclave section of the percolator set. Using a D.O.F. of 6.4, a first exiting extract from the fresh stage of the autoclave section, equivalent to a D.O.F. of 3.0, was taken as the product portion of the autoclave coffee extract. This portion constituted 61.2 pounds of extract having a concentration of 7.0% solids by weight.

The second exiting portion from the fresh stage of the autoclave section, equivalent to a D.O.F. of 3.4 (68.3 pounds) was cooled to 100°F and fed to a surge tank from which it was fed to the spent stage of the atmospheric section at 274°F. The concentration of this feed was about 6.50% solids by weight. An atmospheric coffee extract was drawn off from the fresh stage of the atmospheric section using a D.O.F. of 1.0 (20.6 pounds of extract) and cooled to 100°F. The concentration of this extract was 21.6% soluble coffee solids by weight.

In order to obtain a final composite mixture having 22% solids by weight, it was found that only 42.2 pounds of water had to be removed from the product portion of the autoclave extract (after aromatic stripping) before mixing with the atmospheric coffee extract as compared to 69.8 pounds in the control run. The yield for the process of this invention was 20.7% from the autoclave section and 21.7% from the atmospheric section for a total of 42.4%, all on a dry basis. Thus, increased concentrations were achieved in the atmospheric section, resulting in reduced evaporator loads for the autoclave product, without a reduction in yield for the overall process.

The experimental product (with 3% by weight aromatics and freeze-dried) was equally preferred to the product produced in the control run on the basis of panel taste-test results.

In a previously discussed embodiment of this invention, where the product streams are combined after separate drying, and wherein the atmospheric coffee extract is freeze-dried, it is found that a larger freeze-dried fraction is obtained with no increase in the freeze-dryer load. Thus, using the above example, freeze-drying the atmospheric coffee extract to a moisture content of 3.0% requires the removal of 17.5 pounds of water in the control run and results in 3.7 pounds of product. In the experimental run, however, drying to 3.0% moisture requires the removal of 16.0 pounds of water and results in 4.6 pounds of product.

While the above description has made use of particular examples of the process of this invention, they are intended to be illustrative only, and various modifications and changes are believed ascertainable without departing from the scope and spirit of this invention.

We claim:

1. A process for producing coffee extract by split-extraction percolation of roasted and ground coffee wherein a percolator set is divided into an atmospheric section and an autoclave section, comprising
   a. extracting soluble coffee solids from roasted and ground coffee in said autoclave section by passing an aqueous autoclave extraction liquid through said autoclave section;
   b. drawing off a pre-determined quantity of autoclave coffee extract from the fresh stage of said autoclave section;
   c. splitting said autoclave coffee extract into a product portion and a feed portion;
   d. passing the feed portion of said autoclave extract through said atmospheric section to extract soluble coffee solids from the roasted and ground coffee in said atmospheric section;

e. drawing off a pre-determined quantity of atmospheric coffee extract product from the fresh stage of said atmospheric section; and f. further processing said atmospheric coffee extract and said product portion of said autoclave coffee extract to obtain a dry instant coffee product.

2. The process of claim 1 wherein said product portion of said autoclave coffee extract is the first portion of said autoclave coffee extract drawn off from said fresh stage of said autoclave section.

3. The process of claim 1 wherein said product portion of said autoclave coffee extract is the second portion of said autoclave coffee extract drawn off from said fresh stage of said autoclave section.

4. The process of claim 1 wherein said atmospheric coffee extract and said product portion of said autoclave extract are combined before drying.

5. The process of claim 4 wherein said product portion of said autoclave coffee extract is concentrated.

6. The process of claim 5 wherein said product portion of said autoclave coffee extract is stripped of aromatics before being concentrated and said aromatics are added to the combined atmospheric coffee extract and the product portion of the autoclave extract before drying.

7. The process of claim 5 wherein said aromatics are added after drying said combined extracts.

8. The process of claim 1 wherein said atmospheric coffee extract and said product portion of said autoclave coffee extract are combined after separate drying.

9. The process of claim 8 wherein said atmospheric coffee extract is freeze-dried and said product portion of said autoclave coffee extract is spray-dried.

10. The process of claim 9 wherein said product portion of said autoclave coffee extract is stripped of aromatics before spray-drying and wherein said aromatics are added to said atmospheric coffee extract before freeze-drying.

11. the process of claim 10 wherein said aromatics are added to said freeze-dried atmospheric coffee extract.

* * * * *